US011292613B2

(12) United States Patent
Kim (10) Patent No.: US 11,292,613 B2
(45) Date of Patent: Apr. 5, 2022

(54) DRONE-STORABLE POLE ELEVATION SYSTEM

(71) Applicant: ISON Co., Ltd., Pohang-si (KR)

(72) Inventor: Eung Ug Kim, Pohang-si (KR)

( * ) Notice: Subject to any disclaimer, the term of this patent is extended or adjusted under 35 U.S.C. 154(b) by 714 days.

(21) Appl. No.: 16/205,741

(22) Filed: Nov. 30, 2018

(65) Prior Publication Data

US 2020/0140121 A1    May 7, 2020

(30) Foreign Application Priority Data

Nov. 2, 2018   (KR) ........................ 10-2018-0133951

(51) Int. Cl.
| | |
|---|---|
| *B64F 1/22* | (2006.01) |
| *H04L 5/00* | (2006.01) |
| *H04N 7/18* | (2006.01) |
| *H04N 5/247* | (2006.01) |

(52) U.S. Cl.
CPC ............ *B64F 1/222* (2013.01); *H04L 5/0053* (2013.01); *H04N 5/247* (2013.01); *H04N 7/181* (2013.01)

(58) Field of Classification Search
CPC .. B64F 1/222; B64F 1/007; B64F 1/22; H04L 5/0053; H04L 5/00; H04N 5/247; H04N 7/181; Y02T 10/7072; Y02T 10/70

USPC ........................................................ 244/114
See application file for complete search history.

(56) References Cited

U.S. PATENT DOCUMENTS

| | | | | |
|---|---|---|---|---|
| 10,112,712 B1 * | 10/2018 | Gentry | ................. | G08G 5/0091 |
| 2008/0226284 A1 * | 9/2008 | Coppola | ............. | G03B 17/561 |
| | | | | 396/428 |
| 2015/0129716 A1 * | 5/2015 | Yoffe | .................... | B64F 1/0297 |
| | | | | 244/110 C |

FOREIGN PATENT DOCUMENTS

| | | |
|---|---|---|
| KR | 10-2017-0138663 | 12/2017 |
| KR | 10-2018-0053973 | 5/2018 |

OTHER PUBLICATIONS

English Specification of 10-2017-0138663.
English Specification of 10-2018-0053973.

* cited by examiner

*Primary Examiner* — Thai Q Tran
*Assistant Examiner* — Nienru Yang
(74) *Attorney, Agent, or Firm* — Anthony Ha & U.S. Patent, LLC

(57) ABSTRACT

According to an embodiment, a drone-storable pole elevation system comprises a pole vertically fastened to a ground, an elevation device formed through the pole to be moved up or down by external power, and at least one drone station formed on the elevation device and having a top opening to receive a drone.

14 Claims, 7 Drawing Sheets

Fig. 1

Prior Art

DRONE-STORABLE POLE ELEVATION SYSTEM

CROSS-REFERENCE TO RELATED APPLICATION(S)

This application is based on and claims priority under 35 U.S.C. § 119 to Korean Patent Application No. 10-2018-0133951, filed on Nov. 2, 2018, in the Korean Intellectual Property Office, the disclosure of which is incorporated by reference herein in its entirety.

TECHNICAL FIELD

Various embodiments of the disclosure relate to drone-storable pole elevation systems, and more specifically, to pole elevation systems to elevate a drone

DISCUSSION OF RELATED ART

A drone is an aircraft without a human pilot aboard. Compared to manned aircraft, drones were originally used for missions too "dull, dirty or dangerous" for humans. While they originated mostly in military applications, their use is rapidly expanding to commercial, scientific, recreational, agricultural, and other applications, such as policing, peacekeeping, and surveillance, product deliveries, aerial photography, agriculture, smuggling, and drone racing. Civilian drones now vastly outnumber military drones, with estimates of over a million sold by 2015, so they can be seen as an early commercial application of autonomous things, to be followed by the autonomous car and home robots.

The use of UAVs is also being investigated to help detect and fight wildfires, whether through observation or launching pyrotechnic devices to start backfires.

Figure 1:
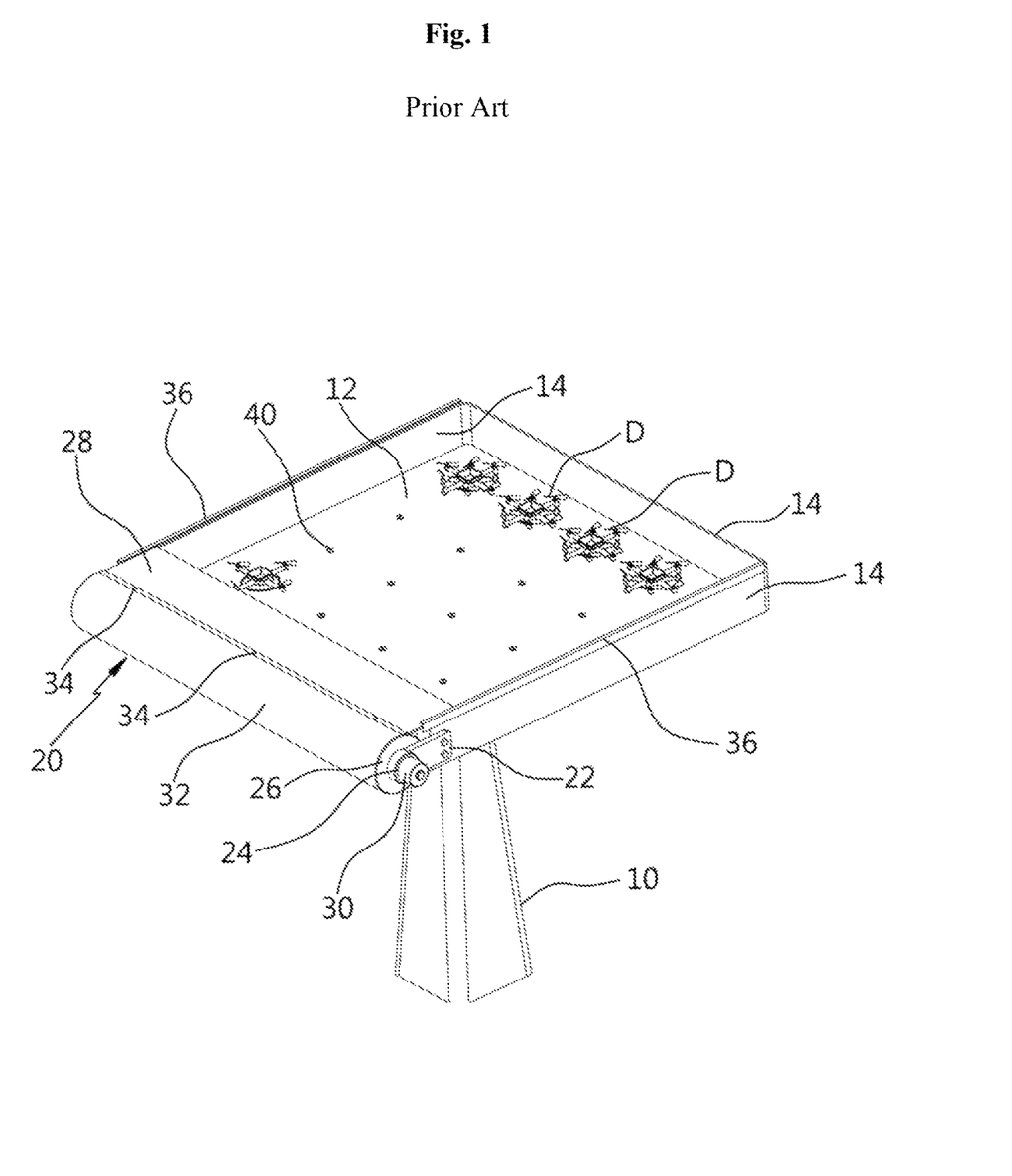
FIG. 1 is a perspective view illustrating a drone station according to the prior art.

A drone requires periodic recharge of its battery. Drones may fly back and land on a drone station for battery recharge or other maintenance purposes. Drone stations are primarily installed in higher places, e.g., the top of a building, than the ground to prevent drones taking off or flying back for landing from crashing other objects. According to the prior art, as shown in FIG. 1, Korean Patent Application Publication No. 10-2018-0053973 discloses a drone station installed on the rooftop of a building and including a support 10 projecting upwards, a rectangular landing pad 12 on the support 10 to allow multiple drones D to be landed thereon, a side plate 14 projecting upwards along the edge of the landing pad 12 and forming walls for the landing pad 12, a plurality of landing guides 40 formed apart from each other at a predetermined interval on the bottom surface of the landing pad 12 to send signals to a landing signal detector of a drone D to guide the landing of the drone D, and a shutter 20 provided at a side of the landing pad 12 to selectively open or close the landing pad 12 to prevent damage to the drone D.

As such, the drone station is installed in a high place, such as on the rooftop of a building, its maintenance may be tricky, and collecting malfunctioning drones requires the worker to climb the drone station, putting the worker at the risk of falling off.

Although such a drone station may be installed on the ground, maintenance or repair is still performed in the high place, thus requiring the use of a costly crane or other equipment to do so.

SUMMARY

According to an embodiment, a drone-storable pole elevation system comprises a pole vertically fastened to a ground, an elevation device formed through the pole to be moved up or down by external power, and at least one drone station formed on the elevation device and having a top opening to receive a drone.

The at least one drone station may be empty and have a sliding door at a top thereof to open or close the at least one drone station for the drone to enter or exit the at least one drone station. When the drone is placed inside the at least one drone station, the sliding door may be closed to protect the drone from an external environment.

A receiving mount may be provided inside the at least one drone station to be moved up when the drone takes off or lands and is moved down when the drone is stored.

The drone-storable pole elevation system may further comprise a capturing device provided inside the at least one drone station to capture an outer appearance of the drone and to determine a state of the drone.

The drone-storable pole elevation system may further comprise a capturing device provided inside the at least one drone station to capture an outer appearance of the drone.

The at least one drone station may be configured to transmit a control signal to the drone to determine an operational state of the drone and to read an image captured by the capturing device to determine whether the drone properly operates.

The at least one drone station may include a plurality of sensors configured to detect a location of the drone when the drone lands and to send a calibration signal to the drone to allow the drone to be landed in place.

A plurality of light emitting devices may be formed on a bottom of the at least one drone station.

The at least one drone station may be configured to be moved down to the ground by the elevation device.

The at least one drone station may include a communication module configured to wirelessly communicate with the drone, and when the drone approaches, identify an identity (ID) of the drone and slide open the sliding door to receive the drone.

The at least one drone station may be configured to identify an ID of the drone received therein to identify a placement position or a moving path of the drone.

The drone-storable pole elevation system may further comprise a power supply provided inside the at least one drone station to charge or replace a battery of the drone while the drone is received in the at least one drone station.

The at least one drone station may be configured to receive information about an object carried by the drone from the drone and to separately place the drone and the object in the at least one drone station.

The drone-storable pole elevation system may further comprise a conveyor provided inside the at least one drone station to move the drone left, right, forwards, or rewards or turn around the drone to correct a placement position of the drone.

The elevation device may include an elevator formed tight in contact with an outer circumference of the pole to support the at least one drone station and configured to ascend or descend along the pole, a support formed at a top of the pole and connected to the elevator via a wire and a plurality of pulleys to support the elevator, and a driver formed at a bottom of the pole to wind or unwind the wire connected with the support to move up or down the elevator.

The drone-storable pole elevation system may be spaced apart from at least one or more drone-storable pole elevation systems with the same structure as the drone-storable pole elevation system at a predetermined interval. The drone may be configured to fly to, and be received in, any of the at least one drone station in the drone-storable pole elevation system or the at least one or more drone-storable pole elevation systems.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Hereinafter, exemplary embodiments of the disclosure are described in detail with reference to the accompanying drawings. The same reference denotations may be used to refer to the same or similar elements throughout the specification and the drawings. As used herein, the singular forms "a," "an," and "the" are intended to include the plural forms as well, unless the context clearly indicates otherwise.

Figure 2:
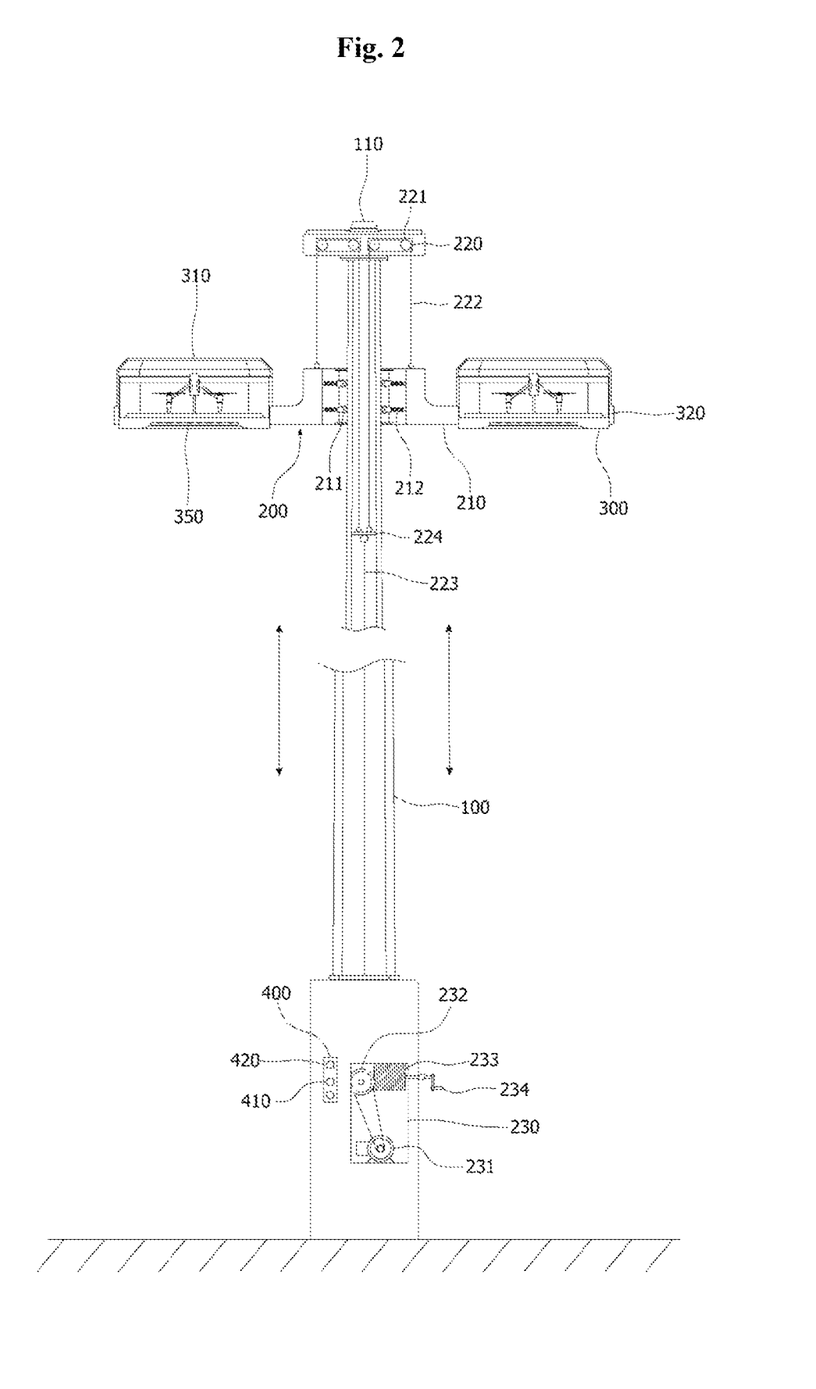
FIG. 2 is a front view illustrating a drone-storable pole elevation system according to an embodiment.

FIG. 2 is a front view illustrating a drone-storable pole elevation system according to an embodiment.

Referring to FIG. 2, a drone-storable pole elevation system may include a pole 100 vertically fastened to the ground, an elevation device 200 formed at the pole 100 to be vertically moved up or down by external power, and at least one drone station 300 formed at the elevation device 200 and having a top opening to receive a drone.

The pole 100 may support the elevation device 200 and the drone station 300 and allow the drone station 300 to ascend by the elevation device 200. The pole 100 may be installed on a ground structure.

The ground structure may be a concrete foundation. The pole 100 may be fastened onto the ground structure by a plurality of anchor bolts inserted into the ground structure and raised perpendicular to the ground.

The pole base which is the bottom part of the pole 100 has a plurality of holes. The anchor bolts may be inserted through the holes of the pole base and coupled with their corresponding nuts, and thus be fastened onto the ground, stably supporting the drone station 300.

The pole 100 may be empty inside and be tapered towards the top. Such structure and shape of the pole 100 may mitigate vibrations that may arise due to winds, earthquake, or other external impacts.

A lamp 110 may be formed on the top of the pole 100 to allow the presence of the pole 100 to be easily noticed, e.g., at night, preventing an air plane from crashing the pole 100 during its night flight.

Drones may recognize and calibration the position of the pole 100 based on light or flicker signals emitted from the lamp 110.

The elevation device 200 may move the drone station 300 up or down along the pole 100. The elevation device 200 may include an elevator 210 formed around the pole 100 and tightly contacting the outer circumference of the pole 100 and ascending or descending while supporting the drone station 300, a support 220 formed at the top of the pole 100 and wired to the elevator 210 through multiple pulleys 221 to support the elevator 210, and a driver 230 formed at the bottom of the pole 100 and winding or unwinding the support 220 to move up or down the elevator 210.

The elevator 210 has a central through hole through which the pole 100 passes, ascending or descending the pole 100 while tightly contacting the outer circumference of the pole 100. The elevator 210 extends in two opposite directions, allowing one or more drone stations 300 to be placed thereon. For example, the elevator 210 may have a left extension and a right extension so that a first drone station 300 and a second drone station 300 may be placed on the left extension and the right extension, respectively.

The elevator 210 may further include a front extension and a rear extension to allow a third drone station 300 and a fourth drone station 400 to be respectively placed thereon. As such, a plurality of drone stations 300 may be symmetrically formed with respect to the pole 100 to allow the elevator 210 to ascend or descend stably without leaning over to any one side.

Alternatively, a drone station 300 may be formed on one side of the elevator 210, and a base (not shown) may be formed, instead of another drone station, on the opposite side. For security purposes, as an example, a surveillance camera (e.g., a closed-circuit television (CCTV)) may be formed on the top of the base (not shown), and a dome camera (not shown) may be formed on the bottom of the base (not shown).

In this case, an anti-eccentricity means (not shown) may be formed to prevent the center of gravity of the elevator 210 from going off the midpoint and resultantly leaning over to one side.

Multiple elastic members 212 and the respective corresponding pressurizing rollers 211 on the elastic members 212 may be projected from the inner circumference in the through hole of the elevator 210 to the outer circumference of the pole 100. As the elevator 210 ascends or descends, the pressurizing rollers 211 may be rolled in the ascending or descending direction of the elevator 210 while tightly contacting the outer circumference of the pole 100.

The pressurizing rollers 211 allow the elevator 210 to stably ascend or descend along the outer circumference of the pole 100. Since the pressurizing rollers 211 may be pushed towards the pole 100 by the elastic members 212, the pressurizing rollers 211 may remain in tight contact with the outer circumference of the pole 100 even when they are positioned on an upper portion of the pole 100 which is smaller in diameter than the lower portion of the pole 100.

As the elevator 210 descends the pole 100, the pressurizing rollers 211 may be pushed back against the lower portion of the pole 100 which is larger in diameter than the upper portion, compressing the elastic members 212.

The support 220 at the top of the pole 100 may connect the elevator 210 with the driver 230 via wires 222 and 223 and multiple pulleys 221, so that the elevator 210 may be moved up or down as the driver 230 operates.

The wires 222 and 223 include first wires 222 provided at both sides at the top of the elevator 210 and inserted into the inside of the pole 100 by pulleys 221 provided at the top of the pole 100 and a second wire 223 provided inside the pole 100 and wound or unwound by the driver 130 at the bottom of the pole 100. The first wires 222 and the second wire 223 may be connected together by a connector 224 provided inside the pole 100.

There may be provided a plurality of first wires 222, e.g., two first wires 222. The first wires 222 may be connected to both sides of the top of the elevator 210 and pulled into the inside of the pole 100 by the pulleys 221. The first wires 222 may be provided symmetrical to each other with respect to the pole 100 and may be wound or unwound by the second wire 223 while preventing the elevator 210 form leaning over to one side.

The driver 230 may wind or unwind the second wires 223 to move up or down the elevator 210. The driver 230 may include a driving motor 231 to provide a rotational force, a decelerating gear 232 connected with the driving motor 231 via a belt or chain to convert the rotational speed of the driving motor 231 into a preset rotational speed, and a winch 233 rotatably connected with the decelerating gear 232 to wind or unwind the second wires 223.

When the driving motor 231 is operated to allow the winch 233 to wind the second wires 223, the connector 224 connected with the second wires 223 descends to pull the first wires 222 into the inside of the pole 100, and the first wire 222 connected with the elevator 210 via the pulleys 221 is moved to lift the elevator 210.

In contrast, when the winch 233 unwinds the second wires 223, the elevator 210 is moved down by gravity to pull the first wires 222 out of the pole 100, and the connector 224 and the second wire 223 are moved to the top of the pole 100.

A lever 234 for manual handling may be provided at the winch 233 of the driver 230, allowing the second wire 223 to manually be wound or unwound to move up or down the elevator 210, e.g., during power outage or when the driving motor 231 is damaged.

The drone station 300 may receive or house a drone. The drone station 300 is empty inside and has a top opening. The drone station 300 may have an opening door 310 at the top to slide in or out to open or close the top. When a drone is housed inside the drone station 300, the opening door 310 may slide to close the opening to protect the drone from the external environment.

The opening door 310 of the drone station 300 may laterally slide in or out to open the top opening of the drone station 300 when a drone takes off or lands, so that the drone may come into the drone station 300 through the top opening.

The drone station 300 may further include a receiving mount 320 therein. The receiving mount 320 may ascend when the drone takes off or lands and descend while the drone is received.

The receiving mount 320 may assist in the drone's takeoff or landing by ascending or descending inside the drone station 300. For example, when the drone attempts to land, the receiving mount 320 may move up in the drone station 300, and when the drone lands on the receiving mount 320, the receiving mount 320 may descend in the drone station 300 to safely house the drone.

Conversely, when the drone attempts to take off, the receiving mount 320 may ascend to place the drone on the top of the drone station 300, allowing the drone to easily fly out.

In other words, the receiving mount 320 enables the drone to take off or land on the top of the drone station 300. This enables the drone's takeoff and landing to be performed in a broad space, preventing the drone from crashing its ambient obstacle and hence damage thereto.

A plurality of light emitting devices 360 may be formed on the bottom of the drone station 300 to emit light to the ground. Thus, the light emitting devices 360 may serve as a lamp to shine the surroundings.

For example, the light emitting devices 360 may play a role as a streetlight where the pole 100 is installed on the street or road.

The light emitting devices 360 may be formed in a module for easier replacement and maintenance. Since the drone station 300 can be moved up or down by the elevator 200, the light emitting devices 360 may easily be replaced while the drone station 300 is in the lower position.

A surveillance camera (e.g., a CCTV) may be provided at the elevator 210 of the elevation device for monitoring the surroundings or for other security purposes.

The controller 400 may be formed at the bottom of the pole 100. The controller 400 includes a plurality of control buttons 410 to manually control the elevation device 200 and the drone station 300 and a control lamp 420 to identify whether signals are input and whether the system operates.

The controller 400 may be connected to the drone station 300 via cables inside the pole 100 to transmit power and control signals to the drone station 300. The controller 400 may be connected with an external communication network to remotely control the drone station 300 and the elevation device 200.

Figure 3:
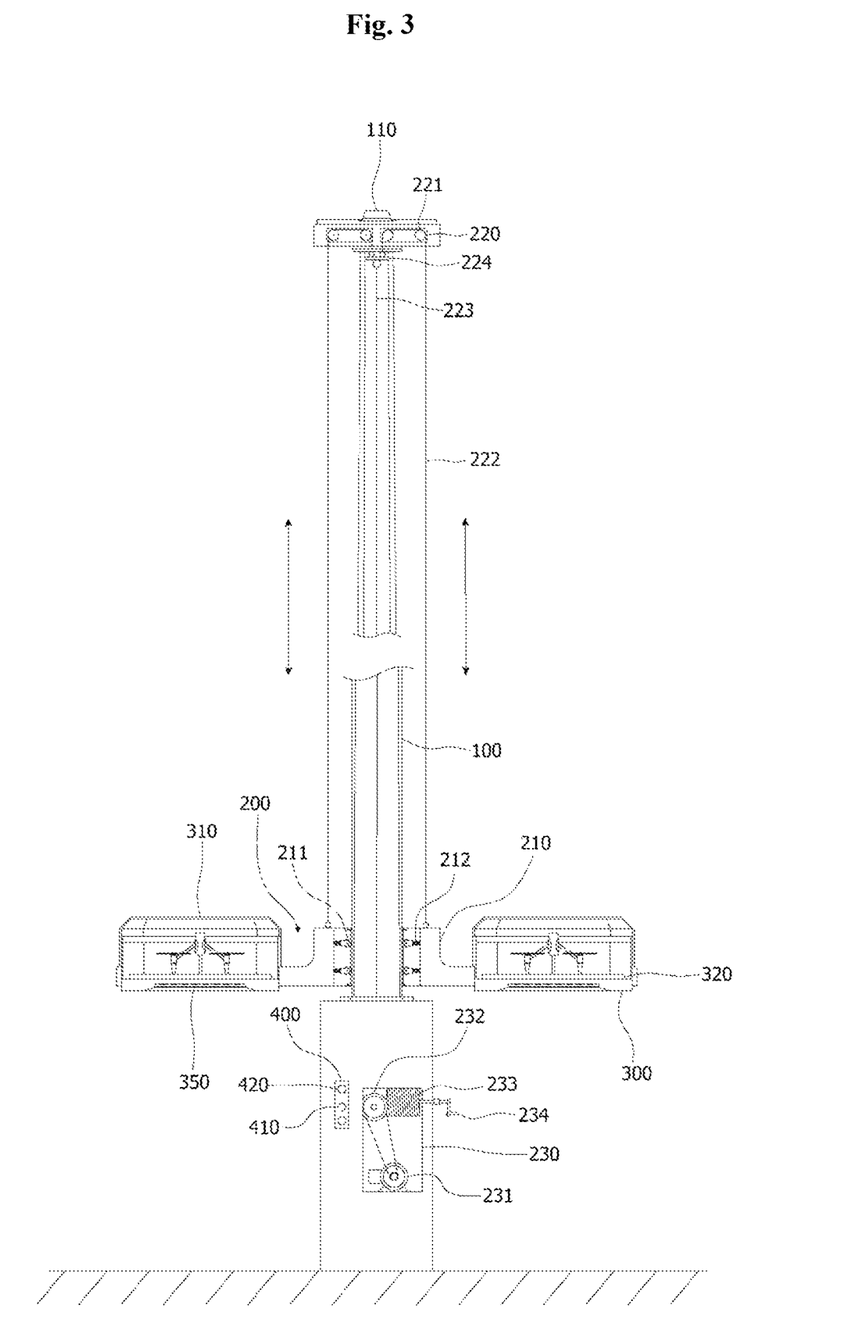
FIG. 3 is a front view illustrating a drone-storable pole elevation system in which one or more drone stations descend, according to an embodiment.

FIG. 3 is a front view illustrating a drone-storable pole elevation system in which one or more drone stations descend, according to an embodiment.

Referring to FIG. 3, in the drone-storable pole elevation system, the drone stations 300 may be moved down by the elevation device 200 so that the drone stations 320 and drones may be subject to easier maintenance. Although a plurality of drone stations 300 are described and shown throughout the specification and the drawings, embodiments of the disclosure are not limited thereto, but rather only one drone station 300 may be included in the system.

The drone stations 300 may be moved down to the bottom of the pole 100 by the elevation device 200. Thus, a worker or operator may safely work on the drone stations 300 for maintenance or recover the drones in the drone stations 300 for repair without the need for a ladder or other equipment.

As such, the worker may carry out maintenance in a stable posture because they need not work in high places.

As the drone stations 300 are moved down by the elevation device 200, the connector 224 provided inside the pole 100 may be positioned at the top of the pole 100 so that the first wires 222 may mostly be exposed to the outside, and the connector 224, when positioned at the tip of the top of the pole 100, may be stopped from moving further.

For example, limit switches (not shown) may be provided at the top and bottom of the pole 100 along which the elevator 210. When the elevator 210 contacts or approaches the limit switch, the driver 230 may stop the driving motor 231 from operation, preventing the elevator 210 from ascending further.

Figure 4:
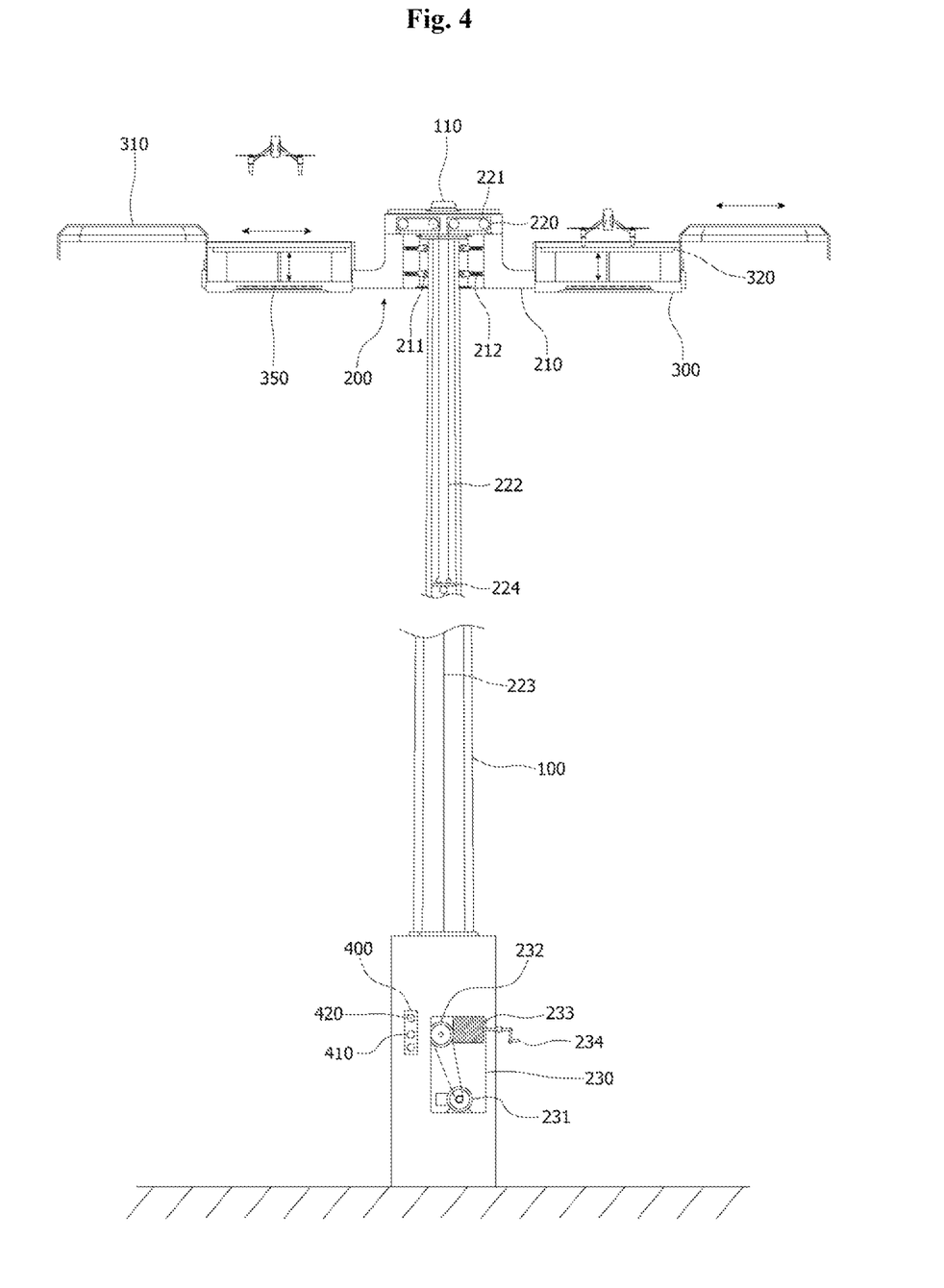
FIG. 4 is a front view illustrating a drone-storable pole elevation system in which one or more drone stations ascend and drones take off or land, according to an embodiment.

FIG. 4 is a front view illustrating a drone-storable pole elevation system in which drone stations ascend and drones take off or land, according to an embodiment.

Referring to FIG. 4, in the drone-storable pole elevation system, the drone station 300 may be moved up to the top of the pole 100 by the elevation device 200. The drone station 300 may wirelessly communicate with the drone. Upon detecting a takeoff or landing signal from the drone, the drone station 300 may open or close the opening door 310 and move up the receiving mount 320 to the top of the drone station 300.

Since the drone station 300 is positioned at the top by the elevation device 200, a flying drone may land on the drone station 300 which is relatively close to the flying drone. Upon the drone's takeoff, the drone may initiate to take off not on the ground but on the drone station 300 which is positioned in the air, and thus, the drone may quickly fly to its flight altitude.

The opening door 310 may be driven by a motor or a cylinder. The opening door 310 may be restricted by a rail formed at the top of the drone station 300 to slide laterally. The receiving mount 320 may be restricted by a rail formed at an inner side surface of the drone station 300 to be vertically moved and be moved up or down by a motor or a cylinder.

The lamp 110 provided at the top of the pole 100 may emit flashes or bird distress signals to repel birds to assist in the drone taking off or landing safely.

Figure 5:
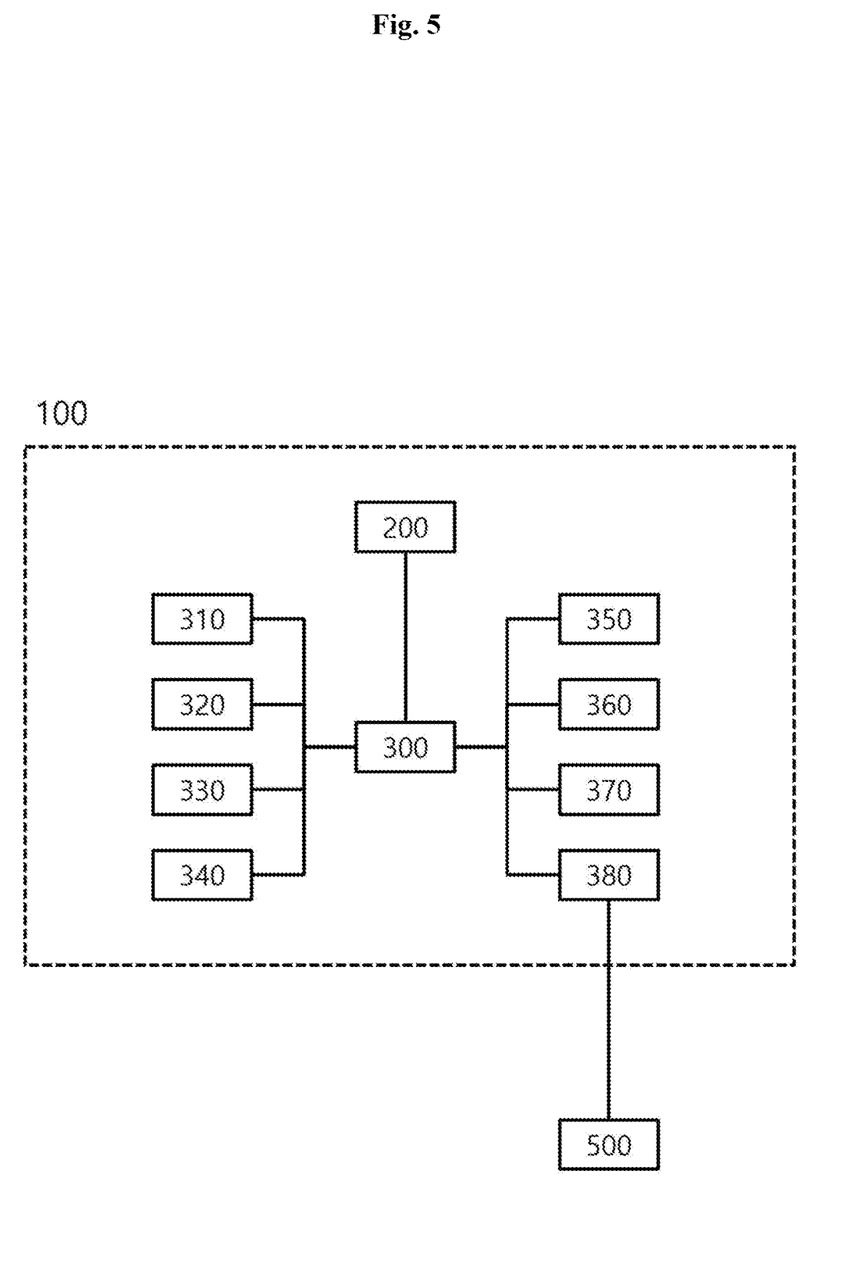
FIG. 5 is a view illustrating an overall configuration of a drone-storable pole elevation system according to an embodiment.

FIG. 5 is a view illustrating an overall configuration of a drone-storable pole elevation system according to an embodiment.

Referring to FIG. 5, in the drone-storable pole elevation system, the drone station 300 may include a communication module 370 and wirelessly communicate with the drone and recognize the identity (ID) of the drone via the communication module 370. Upon detecting the drone's approach by recognizing the ID of the drone, the opening door of the drone station 300 may automatically slide open, preparing to store the drone.

The drone station 300 may identify the ID of the drone, identify the placement position of the drone, or set a moving path for the drone.

The communication module 370 of the drone station 300 may wirelessly communicate with a drone flying nearby, and when the drone emits a landing signal, the drone station 300 may identify the drone by transmitting and receiving encrypted signals, which have previously been set, to/from the drone via the communication module 370.

For example, identification information (e.g., ID) about the drone may previously be entered to the drone station 300, and the drone station 300 may communicate with a drone flying nearby to receive the identification information from the drone and determine whether the received identification matches the previously entered identification information.

Upon receiving a request (e.g., signal) for landing from the drone, the drone station 300 may send an identification information request signal to the drone. In response to the identification information request signal, the drone may transmit its identification information to the drone station 300. The drone station 300 may receive the identification information from the drone, and upon determining that the received identification information matches the previously entered identification information, continue to communicate with the drone while sensing location information necessary for landing to the drone to guide the drone to the placement position.

When the drone's identification information matches, the drone station 300 may laterally slide open the opening door 310 and move up the receiving mount 320 to allow the drone to safely land thereon.

When the drone lands on the top of the receiving mount 320, the receiving mount 320 may descend to place the drone inside the drone station 300, and the opening door 310 may slide back to the original position to close the top opening.

Each drone station 300 may transmit the identification information about the drone received therein to a server 500 via an external communication network to put the control tower or remote control site on notice for the location of the drone. The drone station 300 may receive control signals from the server 500 and transmit the control signals to the drone to control the flying route of the drone.

The drone station 300 may include a plurality of sensors 330 to detect the location of the drone when the drone lands and to send a calibration signal to the drone so that the drone may be landed in place.

The sensors 330 may be formed on the top of the drone station 300 while being spaced apart from each other at a preset interval. When the drone attempts to land by sending a landing signal, the sensors 330 may sense the location of the drone and transfer the location information about the drone to the drone station 300.

The drone station 300 may perform computation on the location information received from the sensors 330 and transmit a calibration signal to the drone to allow the drone to be landed on the top center of the receiving mount 320. The drone may move in a distance corresponding to the received calibration signal and receive a reconfirmation for landing location from the drone station 300.

The drone station 300 may repetitively transmit calibration signals until the location of the drone is within a preset tolerance range, and the drone corrects its position accordingly. After such a series of steps are repeated, the drone may be landed on the top of the receiving mount 320.

The drone station 300 may further include a capturing device 340 therein to capture the outer appearance of the drone and determine the state of the drone.

The capturing device 340 may include one or more cameras to capture the outer appearance of the drone received in the drone station 300 and transmit the captured image to the server 500 through the external communication network so that the outer appearance can be in real-time identified at the control tower or remote control site.

The worker may check if the drone is damaged or broken from the remotely received images. When the drone is broken, the drone may safely be protected in the drone station 300 until the worker pulls out the drone.

The drone station 300 may transmit control signals to the drone to grasp the operational state of the drone and may read images captured by the capturing device 340 to determine whether the drone properly operates.

While the drone is kept in the drone station 300, the drone may be observed through one or more cameras at the control tower or remote control site. Control commands may be generated to allow the drone received in the drone station 30 to be operated by inspection commands.

The control commands may be intended for identifying whether various devices mounted in the drone are operated and whether the propellers of the drone operate. When the drone is operated inside the drone station 300 by the control command, the control tower or remote control site may identify images captured by the capturing device 340 and determine whether the drone operates properly.

The capturing device 340 may allow for a determination as to the contamination or damage to the drone by comparison between images captured in the current state of the drone and images captured while the drone is in its normal state. Where the drone is broken or contaminated, its relevant information may be transmitted to the control tower or remote control site for more objective analysis.

The drone station 300 may further include a power supply 350 therein to charge or replace the battery of the drone while the drone is kept in the drone station 300.

The power supply device 350 may be intended for charging or replacing the battery of the drone in the drone station 300. A plurality of batteries may be reserved in the power supply device 350, and one of them may be fully charged and is then replaced with the battery of the drone.

The power supply device 350 may include a link structure with a robot arm or a conveying means to dock with the battery of the drone. The power supply device 350 may collect the battery from the drone by the conveying means and mount a fully-charged battery in the drone, allowing the drone to be quickly back on duty.

Instead of replacing batteries, the power supply device 350 may dock with the drone to supply power to charge the battery of the drone.

The drone station 300 may further include a conveyor 380 therein to move the drone left, right, forwards, or rewards or turn around the drone to correct the position of the drone.

The conveyor 380 may more accurately move the drone in the drone station 300 to the position where the battery of the drone may dock with the power supply device 350 or may move the drone so that even the portion of the drone located in the blind zone of the capturing device 340 can be captured.

The conveyor 380 may be provided on the top of the receiving mount 320 to be rotated or moved to one side or its opposite side or to the front or back on the top of the receiving mount 320.

The capturing device 340 may capture the drone being conveyed by the conveyor 380 and compare the captured image with a reference image for the docking position of the power supply device 350 to determine the position of the drone.

Figure 6:
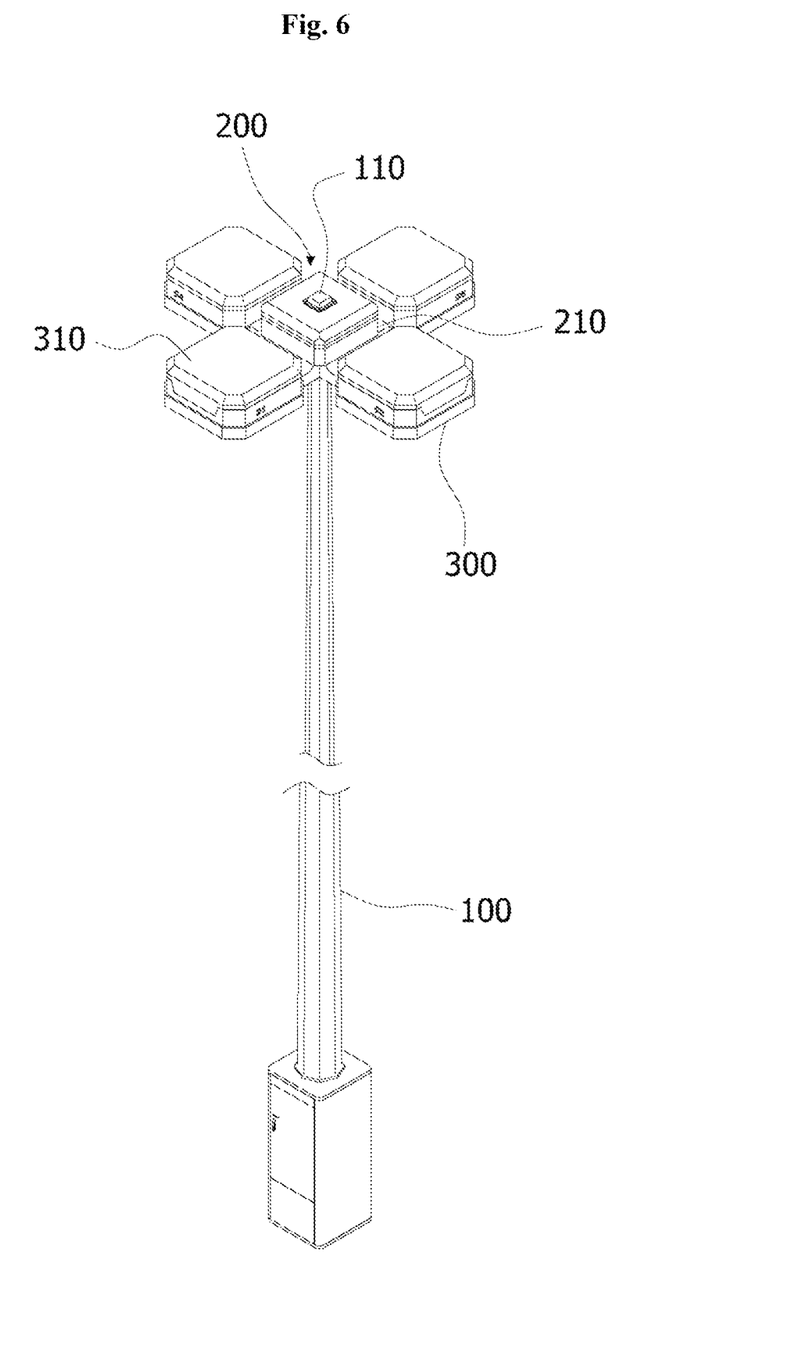
FIG. 6 is a perspective view illustrating a drone-storable pole elevation system with a plurality of drone stations according to an embodiment.

FIG. 6 is a perspective view illustrating a drone-storable pole elevation system with a plurality of drone stations according to an embodiment.

Referring to FIG. 6, a drone-storable pole elevation system may include a plurality of drone stations 300 and may receive object information about the objects carried by drones from the drones and place the objects and the drones in different drone stations 300.

The plurality of drone stations 300 may be provided on the elevator 210 of the elevation device 200, and each drone station 300 may receive a drone or an object carried by the drone.

In other words, the drone may transmit a signal for landing, along with the object information, to one drone station 300 to allow the drone station to receive the object and then send a signal for landing to another drone station 300 to land thereon.

The information about the object received in the drone station 300 may be transmitted to the drone station 300, and via the external communication network, to the control tower or remote control site. When the drone takes off, the opening door 310 of the drone station 300 storing the object may be opened so that the drone can pick and carry the object.

The drone-storable pole elevation system may be configured so that a drone set to cruise only to a preset site for quicker delivery may place the object and then return back to the preset site, and another drone set to cruise to a destination may pick the object from the drone station 300 and carry the object.

Figure 7:
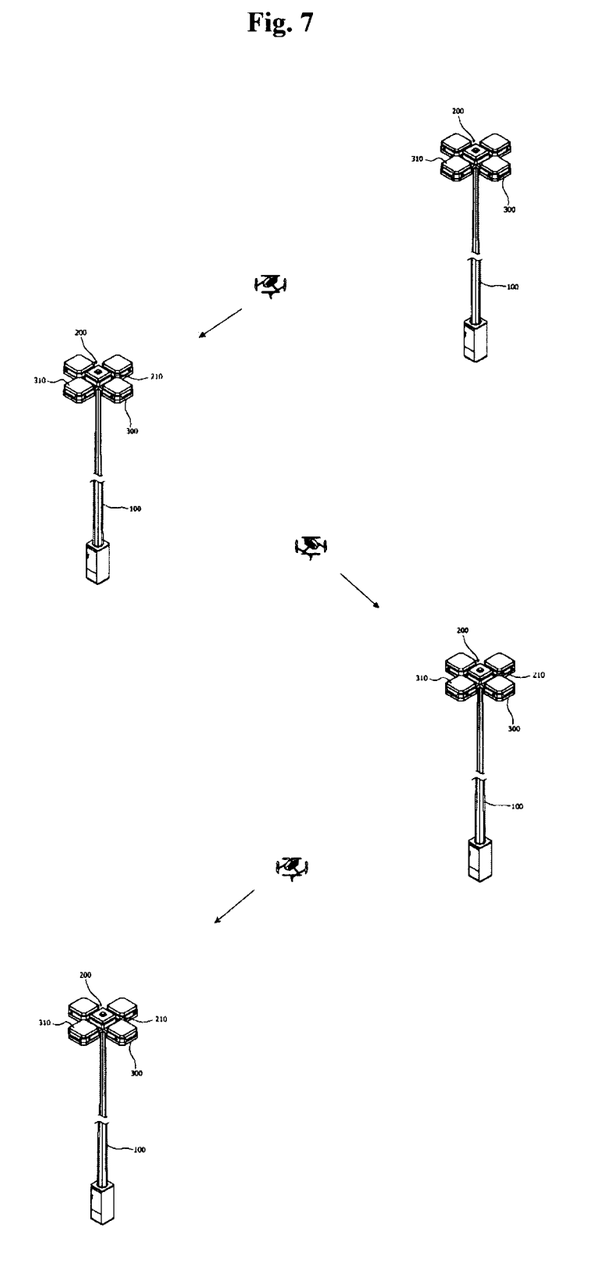
FIG. 7 is a perspective view illustrating a drone-storable pole elevation system which a drone flies along a direction, according to an embodiment.

FIG. 7 is a perspective view illustrating a drone-storable pole elevation system which a drone flies along a direction, according to an embodiment.

Referring to FIG. 7, a plurality of drone-storable pole elevation systems may be spaced apart from each other at a preset interval. Each drone may fly to a drone station 300 in a drone-storable pole elevation system and then land on the drone station 300. As such, the drones may fly along a direction in a long distance.

Typically, a drone is set to return to its drone station 300 when the remaining battery reaches a preset value to prevent the drone from falling off or missing due to battery shortage. Thus, the area where one drone can cover or observe is relatively small.

To address such issue, a plurality of drone-storable pole elevation systems may be installed apart from each other at a predetermined distance. Thus, a drone which has taken off one drone station 300 in a drone-storable pole elevation system may go and land on one drone station 300 in another drone-storable pole elevation system, thus flying a long distance along a direction.

Thus, the drone may gather traffic information while traveling over a road or monitor a wildfire while flying along a mountain ridge, and use of a number of drones allows for a rapid monitoring of a broader area.

Each drone may be received in one of the drone stations 300 based on identification information. The drones may perform continuous monitoring and gather information. The information gathered by the drones may be transmitted through the external communication network connected with each drone-storable pole elevation system to the control tower or remote control site and be identified at the control tower or remote control site.

Where the distance between the drone-storable pole elevation system reduces, information captured by the drone may be wirelessly transmitted to the drone station 300 which may then transfer the received information to the control tower or remote control site via the external communication network.

As described above, according to various embodiments, in the drone-storable pole elevation system, the drone station may be moved up to allow a flying drone to land in the air. When the drone encounters an error, the drone station may descend, allowing the drone to be checked and repaired on the ground. When the drone is received and stored in the drone station, the drone may be prevented from damage by the external environment and be remotely checked on its state. The drone may remotely be controlled and images captured by the drone may remotely be transmitted.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A drone-storable pole elevation system, comprising:
    a pole vertically fastened to a ground;
    an elevation device formed through the pole to be moved up or down by external power; and at least one drone station formed on the elevation device and having a top opening to receive a drone, wherein the elevation device includes:

an elevator formed tight in contact with an outer circumference of the pole through a plurality of elastic members and pressurizing rollers and supporting the at least one drone station and configured to ascend or descend along the pole;

a support formed at a top of the pole and connected to the elevator via a plurality of wires and a plurality of pulleys to support the elevator, and a driver formed at a bottom of the pole to wind or unwind the wire connected with the support to move up or down the elevator, wherein the plurality of pulleys are included in the support and include a first group of pulleys and a second group of pulleys disposed symmetrically with respect to the pole, wherein the plurality of wires includes a first wire connected to a first top end of the elevator and extending along the first group of pulleys to an inside of the pole and a second wire connected to a second top end of the elevator and extending along the second group of pulleys to the inside of the pole, and wherein the first wire and the second wire are jointly connected to a connector inside the pole, and the connector to the driver through a single third wire.

2. The drone-storable pole elevation system of claim 1, wherein the at least one drone station is empty and has a sliding door at a top thereof to open or close the at least one drone station for the drone to enter or exit the at least one drone station, and wherein when the drone is placed inside the at least one drone station, the sliding door is closed to protect the drone from an external environment.

3. The drone-storable pole elevation system of claim 1, wherein a receiving mount is provided inside the at least one drone station to be moved up when the drone takes off or lands and is moved down when the drone is stored.

4. The drone-storable pole elevation system of claim 1, further comprising a capturing device provided inside the at least one drone station to capture an outer appearance of the drone and to determine a state of the drone.

5. The drone-storable pole elevation system of claim 1, further comprising a capturing device provided inside the at least one drone station to capture an outer appearance of the drone, wherein the at least one drone station is configured to transmit a control signal to the drone to determine an operational state of the drone and to read an image captured by the capturing device to determine whether the drone properly operates.

6. The drone-storable pole elevation system of claim 1, wherein the at least one drone station includes a plurality of sensors configured to detect a location of the drone when the drone lands and to send a calibration signal to the drone to allow the drone to be landed in place.

7. The drone-storable pole elevation system of claim 1, wherein a plurality of light emitting devices are formed on a bottom of the at least one drone station.

8. The drone-storable pole elevation system of claim 1, wherein the at least one drone station is configured to be moved down to the ground by the elevation device.

9. The drone-storable pole elevation system of claim 1, wherein the at least one drone station includes a communication module configured to wirelessly communicate with the drone, and when the drone approaches, identify an identity (ID) of the drone and slide open the sliding door to receive the drone.

10. The drone-storable pole elevation system of claim 1, wherein the at least one drone station is configured to identify an ID of the drone received therein to identify a placement position or a moving path of the drone.

11. The drone-storable pole elevation system of claim 1, further comprising a power supply provided inside the at least one drone station to charge or replace a battery of the drone while the drone is received in the at least one drone station.

12. The drone-storable pole elevation system of claim 1, wherein the at least one drone station is configured to receive information about an object carried by the drone from the drone and to separately place the drone and the object in the at least one drone station.

13. The drone-storable pole elevation system of claim 1, further comprising a conveyor provided inside the at least one drone station to move the drone left, right, forwards, or rewards or turn around the drone to correct a placement position of the drone.

14. The drone-storable pole elevation system of claim 1, wherein the drone-storable pole elevation system is spaced apart from at least one or more drone-storable pole elevation systems with the same structure as the drone-storable pole elevation system at a predetermined interval, and wherein the drone is configured to fly to, and be received in, any of the at least one drone station in the drone-storable pole elevation system or the at least one or more drone-storable pole elevation systems.

* * * * *